(12) United States Patent
Jones et al.

(10) Patent No.: US 8,800,013 B2
(45) Date of Patent: Aug. 5, 2014

(54) DEVOLVED AUTHENTICATION

(75) Inventors: James E Jones, Ipswich (GB); Ian Herwono, Stowmarket (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 12/934,858

(22) PCT Filed: Feb. 19, 2009

(86) PCT No.: PCT/GB2009/000439
§ 371 (c)(1),
(2), (4) Date: Sep. 27, 2010

(87) PCT Pub. No.: WO2009/118502
PCT Pub. Date: Oct. 1, 2009

(65) Prior Publication Data
US 2011/0030043 A1     Feb. 3, 2011

(30) Foreign Application Priority Data
Mar. 28, 2008 (EP) .................................. 08251195

(51) Int. Cl.
*G06F 7/04* (2006.01)
(52) U.S. Cl.
USPC ................................................ 726/7; 726/9
(58) Field of Classification Search
USPC .......................................................... 726/7
See application file for complete search history.

(56) References Cited

U.S. PATENT DOCUMENTS 5,889,942 A * 3/1999 Orenshteyn ........................ 726/3
6,092,196 A * 7/2000 Reiche ............................... 726/6
6,584,505 B1 * 6/2003 Howard et al. ................ 709/225
7,188,360 B2 * 3/2007 Gerdes et al. ...................... 726/4
2003/0154373 A1   8/2003 Shimada
2004/0139349 A1 * 7/2004 Henn et al. ...................... 713/201

OTHER PUBLICATIONS

International Search Report for PCT/GB2009/000439, mailed Oct. 2, 2009.

* cited by examiner

*Primary Examiner* — Kambiz Zand
*Assistant Examiner* — Ghodrat Jamshidi
(74) *Attorney, Agent, or Firm* — Nixon & Vanderhye P.C.

(57) ABSTRACT

A method of authenticating a user to a service provider by means of an authentication provision unit, the method comprising: in a first stage of the method: receiving credentials from a user; determining whether the credentials received from the user represent a valid logon; and if that determination is positive: generating at least one network address comprising a domain address and at least one instance parameter, the instance parameter uniquely identifying the user and the instance of generation of the network address; and providing the network address to the user; and in a second stage of the method: receiving a parameter from a service provider; determining whether the received parameter indicates a valid attempt to log on to the service provider by checking that the received parameter matches an instance parameter that has previously been issued to a user and that has not previously been received from a service provider; and if that determination is positive: signalling to the service provider over a secure channel a message indicating that the received parameter represents a valid logon attempt, the message including credentials of the user to whom the instance parameter that matches the received parameter had been issued.

16 Claims, 6 Drawing Sheets

DEVOLVED AUTHENTICATION

This application is the U.S. national phase of International Application No. PCT/GB2009/000439 filed 19 Feb. 2009, which designated the U.S. and claims priority to European Application No. 08251195.7, filed 28 Mar. 2008, the entire contents of each of which are hereby incorporated by reference.

BACKGROUND AND SUMMARY

This invention relates to authentication of a user.

Many modern systems require a user to provide credentials in order to gain access to services. Conventionally the user provides a user name and a password to the service provider, and the service provider checks those details against a log-on database in order to verify that they match the credentials of a valid user identity. The user can then be granted rights in accordance with the identity they have demonstrated. It would be insecure for a user to have the same credentials for all service providers, so each user must remember numerous combinations of log-on credentials. If the user tries to remember all their passwords they are at risk of forgetting them, which will mean that they cannot have access to the service until the service-provider has provided them with replacement credentials. The alternative to memorising the credentials is to write them down or store them electronically, but that might give third parties access to them.

To address these problems a number of schemes that use centralised authentication have been devised.

Figure 1:
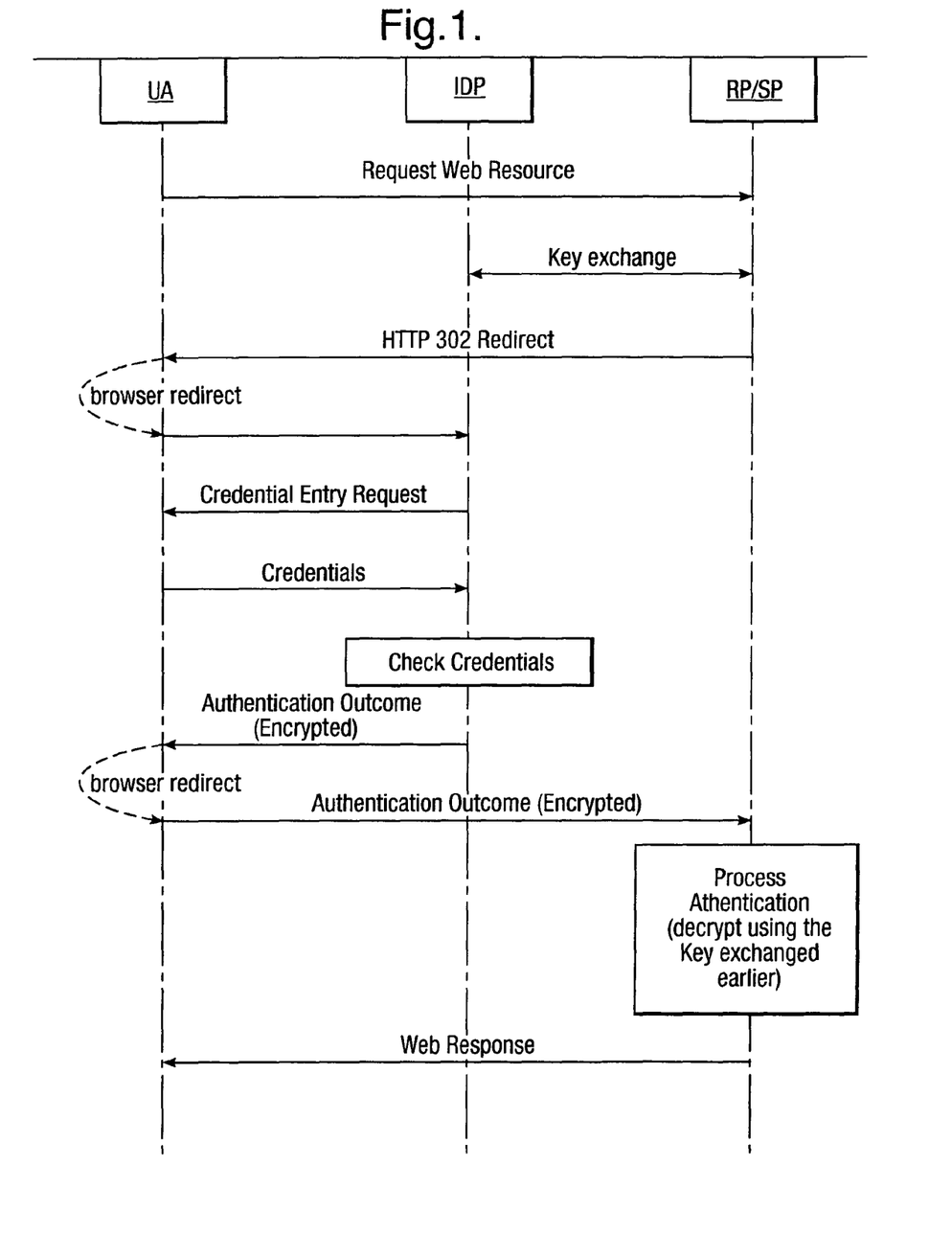
FIG. 1 shows communication flows in the OpenID process.

OpenID offers two modes of operation: dumb mode and smart mode. Dumb mode can only provide an outcome of "true" or "false" from the authentication process, so it is anticipated that in most cases smart mode will be used. OpenID smart mode is illustrated in FIG. 1. The communication sequence starts with the user (UA) requesting a web page served by a web site (more generally a relying party/service provider: RP/SP) using OpenId authentication. The user will be prompted to enter their username. Based on the username the web site establishes which entity acts as identity provider (IDP) for that user. The RP/SP contacts the IDP and exchanges with the IDP key information which will be used to encrypt and decrypt the token that the IDP returns to indicate the outcome of the identification process. Once the IDP and the RP/SP have exchanged key information, the user's web browser is redirected to the IDP's web site by means of an HTTP 302 command. Once that the user's browser has been redirected to the IDP the user enters their authentication credentials, the IDP determines whether those credentials match those of a valid user identity and composes a response that indicates the outcome of that determination. That response is encrypted using the key that was previously exchanged. The user's browser is then redirected back to the web site of the RP/SP by means of an HTTP 302 command. The encrypted authentication outcome is carried within the redirection parameters, so it can be detected by the RP/SP. At the RP/SP the authentication outcome is decrypted, so the RP/SP can find whether the user is authenticated, and as which user identity. The RP/SP then provides a web response to the user based on the authentication outcome.

One problem with OpenId authentication is that different IDPs may provide different qualities of authentication. The authentication process is not standardised in OpenID. Also, in Open ID trust between the user, the RP/SP and the IDP is implied, rather than being enforced by means such as SSL. If that trust is not well placed, the frequent HTTP redirects represent potential security weak points in the process. The OpenId trust model is only implied, there is not enforcement, without the use of additional trust enforcement such as SSL, OpenId is therefore vulnerable.

Figure 2:
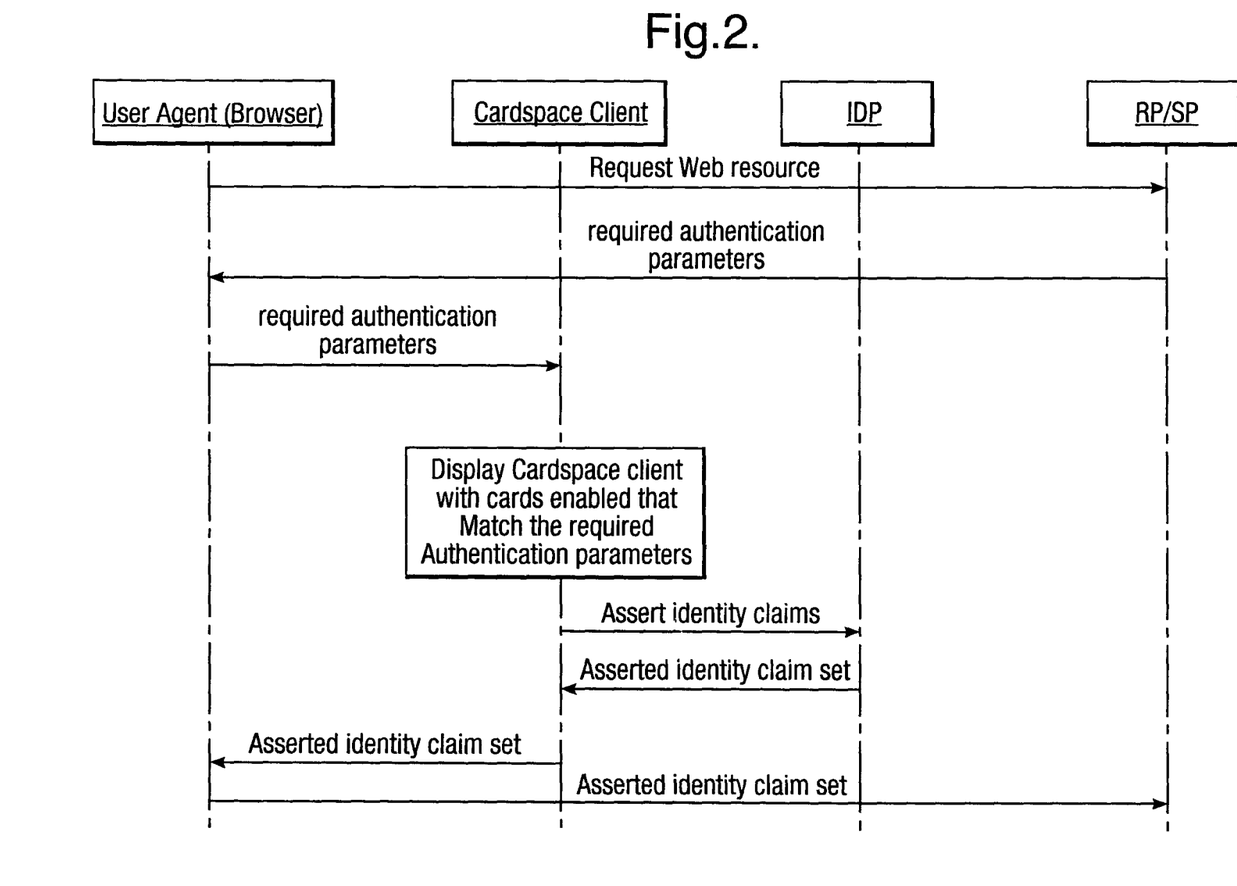
FIG. 2 shows communication flows in the Cardspace process.

Another form of devolved authentication is Microsoft's Cardspace. FIG. 2 shows the communication sequence for authentication using Cardspace. One disadvantage or limitation of Cardspace is that it needs an advanced Cardspace client which manages the (locally stored) information cards available to the user. This means that Cardspace-based authentication can usually be carried out only with a user's own PC, which prevents its use when the user is using a foreign PC, e.g. at an Internet café. A further limitation of the Cardspace client is the dependency on a secured Microsoft Windows operating system, which is not always available to a user. Home users of Microsoft Windows do not always secure their installations by enabling password protection etc. Cardspace is not platform independent, it only runs on Microsoft Windows and many users do not use Microsoft Windows.

The Liberty Alliance's Identity Federation Framework (ID-FF) offers another form of devolved authentication. In the ID-FF system the user has four ways of performing authentication.

1. Authentication may be initiated by the user navigating to the website of the RP/SP. The authentication may then proceed in:
   a. Advanced client mode, which operates similarly to Cardspace.
   b. Native browser functionality mode, which operates similarly to OpenID.
2. Authentication may be initiated by the user navigating to the IDP. The authentication may then proceed in:
   a. Advanced client mode, in which the identity exchange process uses a profile based on SOAP and HTTP. A typical web browser is not able to process SOAP-based web service method calls, so this has the disadvantage that it calls for the user to have some form of advanced client. Also, in this scenario the user has navigated first to the IDP. The mechanism by which the user will consume the services of an RP/SP using any identity assertion he gets from the RP/SP is not clear.
   b. Native browser functionality mode. As with the OpenID process, this makes use of HTTP redirect commands, which represents a potential security risk.

There is therefore a need for an improved mechanism for authentication.

According to one aspect of the present invention there is provided a method of authenticating a user to a service provider by means of an authentication provision unit, the method comprising: in a first stage of the method: a. receiving credentials from a user; b. determining whether the credentials received from the user represent a valid logon; and c. if that determination is positive: i. generating at least one network address comprising a domain address and at least one instance parameter, the instance parameter uniquely identifying the user and the instance of generation of the network address; and ii. providing the network address to the user; and in a second stage of the method: a. receiving a parameter from a service provider; b. determining whether the received parameter indicates a valid attempt to log on to the service provider by checking that the received parameter matches an instance parameter that has previously been issued to a user and that has not previously been received from a service provider; and c. if that determination is positive: signalling to the service provider over a secure channel a message indicating that the received parameter represents a valid logon attempt, the message including credentials of the user to whom the instance parameter that matches the received parameter had been issued.

In the step of providing the network address to the user, the network address may be provided to the user over a secure channel. That may be an encrypted channel.

The secure channel over which the message is signalled to the service provider may be an encrypted channel.

The network address may be provided to the user in the form of a web page having a link to the network address. The instance parameter may be an HTTP querystring parameter to the network address.

The step of determining whether the received parameter indicates a valid attempt to log on to the service provider may comprise checking that user to whom the instance parameter that matches the received parameter had been issued has not logged off from the authentication provision unit since the instance parameter was issued.

The step of determining whether the received parameter indicates a valid attempt to log on to the service provider may comprise checking that the instance parameter that matches the received parameter was issued to a user as part of a network address that included a domain address corresponding to the service provider.

The method may comprise, if the determination in the first stage of the method is positive: i. generating a plurality of network addresses, each network address comprising a domain address and at least one instance parameter, the instance parameter uniquely identifying the user and the instance of generation of the network address; and ii. providing the network addresses to the user.

The network addresses may be provided to the user in the form of iconised links to the network addresses.

The instance parameter may identify the time at which it was generated. The step of determining whether the received parameter indicates a valid attempt to log on to the service provider may comprise checking that the difference between the time at which the instance parameter that matches the received parameter was generated and the current time is less than a predetermined value.

The method may comprise the steps subsequent to step c.ii of the first stage of automatically generating at least one replacement network address comprising the domain address and at least one replacement instance parameter, the replacement instance parameter uniquely identifying the user and the instance of generation of the network address; and providing the replacement network address to the user and subsequently treating the replacement instance parameter as the instance parameter in the second stage of the method.

According to a second aspect of the present invention there is provided an authentication provision unit for authenticating a user to a service provider, the authentication unit being configured to: in a first stage of the authentication process: a. receive credentials from a user; b. determine whether the credentials received from the user represent a valid logon; and c. if that determination is positive: i. generate at least one network address comprising a domain address and at least one instance parameter, the instance parameter uniquely identifying the user and the instance of generation of the network address; and ii. provide the network address to the user; and in a second stage of the authentication process: a. receive a parameter from a service provider; b. determine whether the received parameter indicates a valid attempt to log on to the service provider by checking that the received parameter matches an instance parameter that has previously been issued to a user and that has not previously been received from a service provider; and c. if that determination is positive: signal to the service provider over a secure channel a message indicating that the received parameter represents a valid logon attempt, the message including credentials of the user to whom the instance parameter that matches the received parameter had been issued.

BRIEF DESCRIPTION OF THE DRAWINGS

The present invention will now be described by way of example with reference to the accompanying drawings. In the drawings.

DETAILED DESCRIPTION OF PRESENT EXAMPLE EMBODIMENTS

Figure 3:
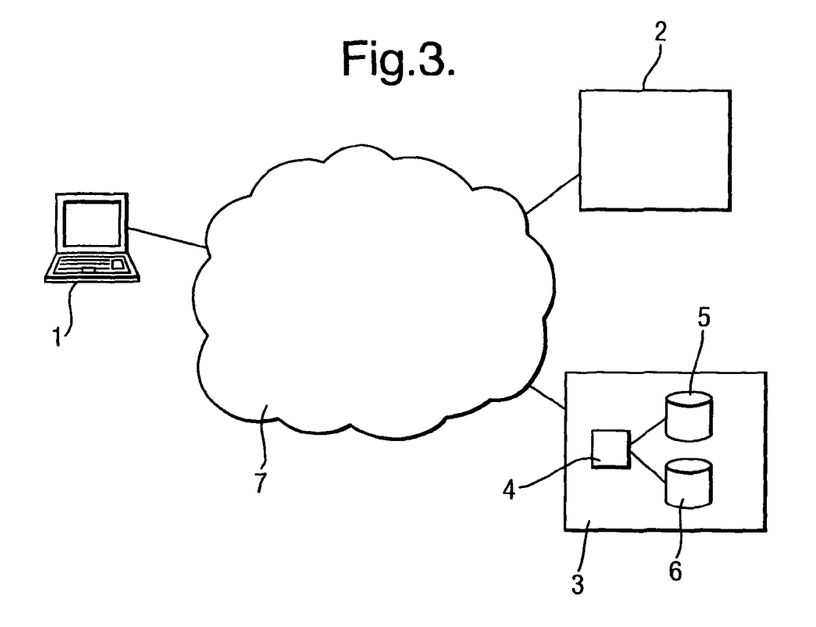
FIG. 3 shows the architecture of a system in which the communication patterns of FIGS. 4 to 6 can take place.

FIG. 3 shows a set of networked data processing devices. The devices include a user terminal 1, a web server 2 of a service provider and an authentication server 3 of an authentication provider. The authentication server 3 includes a processing unit (IDP) 4 which performs authentication operations on received data, including checking that data against user credentials stored in a credential database (IDP data store) 5 and a state database (user status database) 6. The devices 1, 2 and 3 are interconnected by means of a network 7, such as the internet.

The authentication process to be described below involves three main stages:
1. the user registers with the authentication provider, and optionally with the service provider;
2. at some later time when the user wishes to make use of a service from the service provider the user authenticates to the authentication provider;
3. the user navigates to the service provider and is authenticated to the service provider in dependence on his having authenticated to the authentication provider.

Stage 1—Registration with the Authentication Provider

In order to make use of the system the user needs to have a means of authenticating himself to the authentication provider. Typically, this will involve the user establishing an account or identity with the authentication provider and getting secret credentials (such as a username and password) that are shared with the authentication provider. The authentication provider can then store those credentials in the credential database 5 in association with the user's account, and use them to authenticate the user in future. Other methods of authentication include shared certificates, smart cards and passcode generators using shared algorithms and seeds.

The details of the user's account that are stored on the credential database may include additional information such as the rights that a user can have with various service providers, or an account balance.

If the service provider trusts the authentication provider then it may not be necessary for the user to pre-register with the service provider: the service provider could just accept any authentication signalled by the authentication provider. Alternatively, the user could pre-register with the service provider so as to get an account or identity at the service provider. The user could then inform the authentication provider of that account so as to have the authentication provider store data identifying the account at the service provider in association with the user's account at the authentication provider.

Stage 2—Authentication to the Authentication Provider

Figure 4:
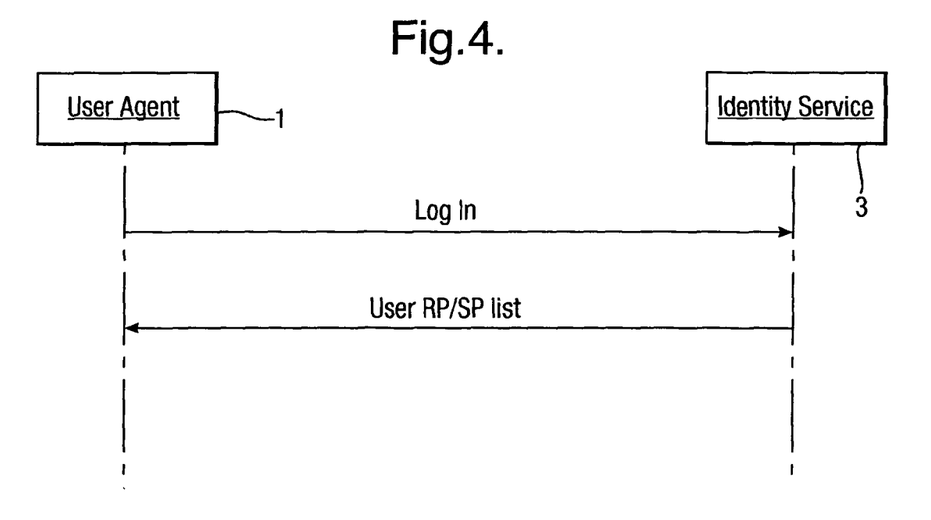
FIGS. 4 to 6 show communication flows in an authentication process.

Communication flows in the process of the user authenticating to the authentication provider are illustrated in FIG. 4. Using a web browser running on the terminal 1 the user navigates to a website provided by the authentication provider's server 3. The website serves a web page that invites the user to provide logon credentials. As discussed above, those credentials could be a username and password, or could take other forms. The user enters the credentials and instructs his web browser to return them to the server 3. The server verifies the credentials against those stored in its database. If they match the credentials of a valid user identity then the user is authenticated; otherwise he is not authenticated.

Figure 7:
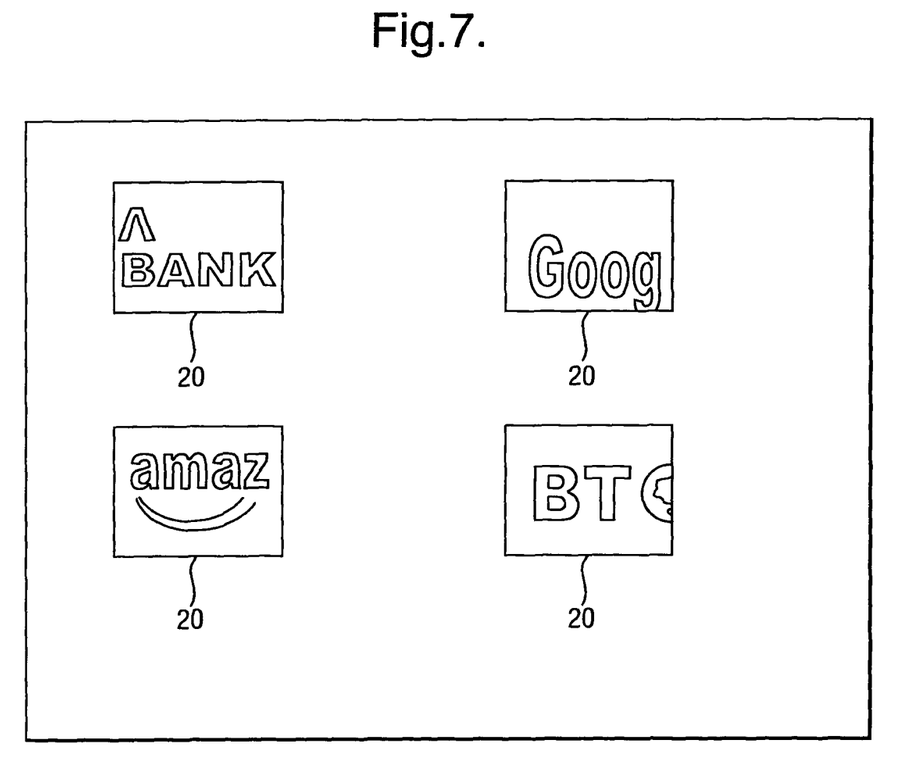
FIG. 7 shows a web page.

If the user is authenticated then the server 3 returns a web page that contains links to the websites of one or more service providers. The page is preferably served over a secure connection such as an SSL link. An example of such a page is shown in FIG. 7. The page contains hotlinks 20, which could be represented by icons, each of which is associated with a uniform resource locator (URL). Each of the URLs is formed by the authentication server in such a way as to link to the website of a respective service provider and also to provide one or more parameters that can be used by the web server 2 of the service provider to further the authentication process. The parameters could be HTTP querystring parameters. In this example, one of the parameters is an identifier known as the instance identifier. The instance identifier is a token generated by the authentication server to be effectively unique to:
 a. the instance of having generated the web page and/or the instance of the user having authenticated to the authentication server; and
 b. the service provider to which the respective URL links.

This parameter therefore also identifies the user. The parameter could be generated using a hashing or encryption function taking the above data as inputs together optionally with other data such as a timestamp or a sequence number. The time at which the parameter was generated could thus be embedded in the parameter. The authentication server stores the parameters that were generated in its database for use in subsequent steps of the authentication process. It may also store the time at which each parameter was generated, so even if the parameter does not contain an encoded timestamp, the authentication server can determine the generation time identified by a particular parameter.

An example of one of the URLs in this form could be:
http://www.yahoo.com?instance_id=eif84mfnwuen98nd
Instead of a single instance identifier parameter, the URLs could have multiple parameters, for example:
 A simplified instance parameter that is generated each time that the user displays their iconised list of RP/SPs and is the same for each of the URLs on iconised list. This reduces the amount of storage needed by the authentication server since the instance value is persisted against the user identified for later consistency checking.
 RPSPinstance: a parameter that provides a unique reference for each RP/SP in a user's profile. This reference ensures consistency between the request and the user, correlated using the instance parameter.
 Callbackurl: This indicates to the RP/SP the network address that is should contact for authentication of the user credentials. Thus, the URLs could also identify the authentication provider, so that the service provider knows which authentication provider has generated them.

An example of one of the URLs in this form could be:
http://www.yahoo.com?instance_id=eif84mfnwuen98nd&RPSPinstance=j48dhaqh&Callbackurl=auth.bt.com
where the instance_id parameter is the instance identifier which uniquely identifies the user and the instance of providing a link to the service provider, the RPSPinstance parameter acts as a unique reference for each RP/SP (in this case yahoo.com) and the callbackurl parameter indicates the authentication provider. In this instance the callbackurl parameter indicates the URL with which the service provider can communicate to verify the authorisation of the user. The parameters could have any suitable names.

The URLs have a single-use lifespan, but the user can manually invalidate them even before they have been used by logging out of the authentication service. When the URLs are timestamped (internally or by reference to a database) they can be expired automatically a predetermined period (e.g. 30 minutes) after they were generated.

If the user wants a new URL (for instance if one he has currently been issued has expired) then provided his session with the authentication server is still active he can reload the page containing the URLs. The authentication server could also refresh the URLs periodically or when one of them has been used to log in to a service provider. It could do this by having the page automatically cause the user's browser to refresh the page so as to load the reissued URLs.

The parameters are stored in the credential database 5 and the login state of the user to the authentication server is stored in state database 6.

Stage 3—Authentication to the Service Provider

Figure 5:
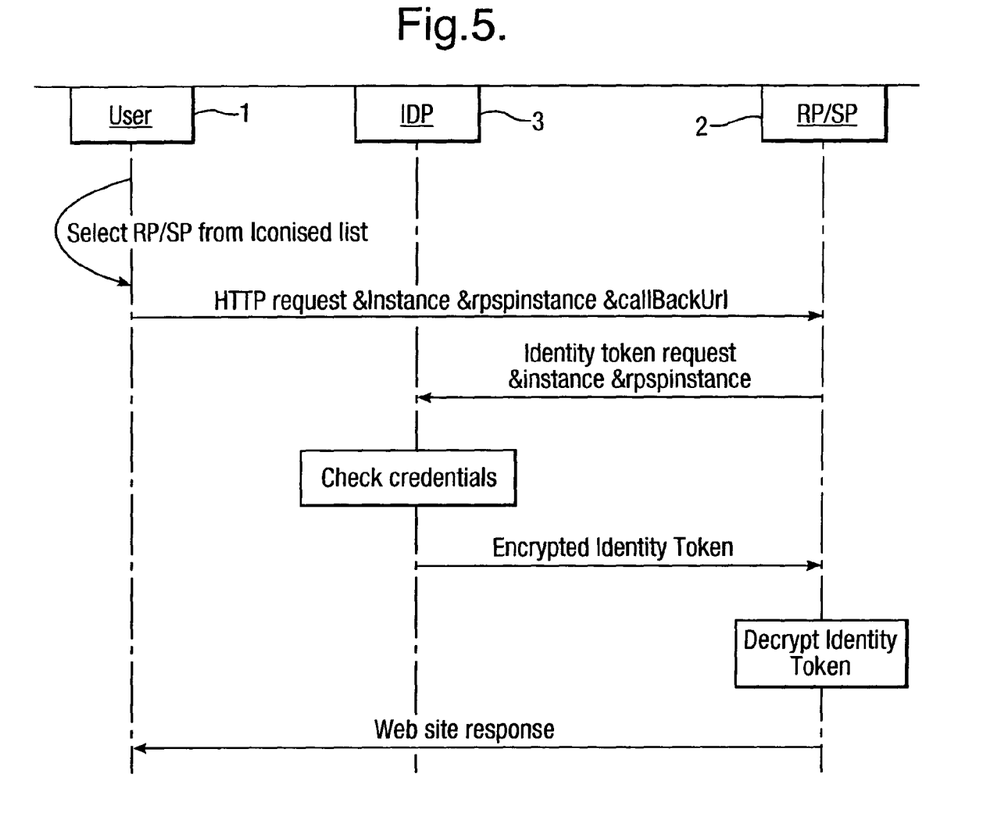

Communication flows in the process of the user authenticating to the service provider are illustrated in FIG. 5.

In order to access one of the service providers the user clicks in his web browser on one of the links on the web page generated by the authentication provider, or otherwise navigates to one of the URLs on that page. This allows the user's terminal to accept a response from the service provider and also provides the parameters of that URL to the server of the service provider.

The service provider's server is pre-programmed with a mechanism for handling the process of verifying the status of the user in dependence upon the parameters supplied in the previous step. In response to receiving a page request supplying such parameters it transmits to the server of the authentication provider a verification request message that has as a parameter the instance_id token that the service provider received from the user. The service provider's server could contact the authentication provider using the content of the auth_prov parameter, or because it is pre-programmed to use a particular authentication provider, or it could try the token with a range of authentication providers to see if any of them accepts it.

On receiving the verification request message the authentication server verifies whether that message represents a valid authenticated user. The mechanism by which it does this will be described in more detail below.

The authentication server forms a result value which identifies the result of the verification process. The value indicates whether or not the verification has been successful: i.e. whether the instance_id token supplied by the service provider represented a valid logged on user identity, and could also indicate other information such as the identity of the logged on user, the access rights of the logged on user or the account balance of the logged on user. The result value is then encrypted by the authentication server to form a return value. The encryption is performed in such a manner such that the return value can be decrypted by the service provider's server. This could be by means of a symmetric encryption/decryption key that is securely shared by the authentication provider and the service provider, or it could be by asymmetric encryption using a public key, the corresponding private key of which is held securely by the service provider. The authentication server transmits a result report message to the service provider's server to indicate the result of the verification process. The message includes the return value as a parameter.

The service provider's server decrypts the return value to obtain the result value. If the result value indicates that the terminal that supplied the instance_id token is validly authenticated then the service provider proceeds accordingly, for example by establishing a communication session with the terminal through which the user of the terminal can obtain services from the service provider. The user could be accorded access rights or privileges in accordance with the optional data that may have been provided in the return value.

Figure 6:
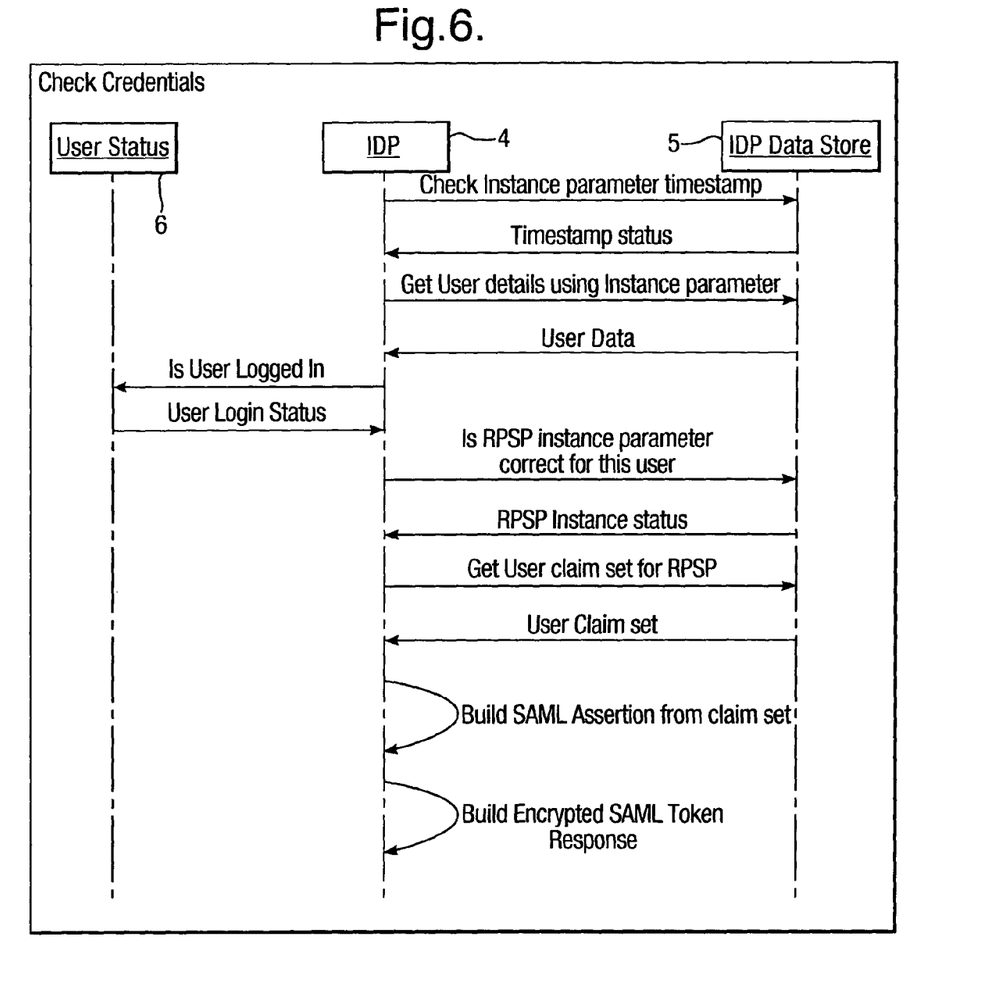

The mechanism by which the authentication server verifies whether the token it receives in the verification request message represents a valid authenticated user is illustrated in FIG. 6. FIG. 6 illustrates communications internal to the authentication server, between the processor 4 which manages authentication processing, the credential database 5 which stores the credentials and the state database 6.

The authentication server decomposes the token to identify any subunits of data within it. In this example, the token comprises a timestamp and an instance parameter.

The server checks that the timestamp is valid: i.e. that it indicates a time within a predetermined period before the time of the check. If it is invalid then authentication fails, otherwise the process proceeds to the next step.

The server looks up the instance parameter in the credentials database to find whether it matches an instance parameter that has been served to a client terminal as an instance identifier. If no match is found then authentication fails, otherwise the server retrieves the details of the user to whom that instance identifier was issued and proceeds to the next step.

The server checks with the session database that that user is currently logged in. If he is not logged in then authentication fails, otherwise the process proceeds to the next step.

The server retrieves information from the credentials database that will allow the service provider to provide the user with services for his account with the service provider. That information could be a username or could be other data preagreed between the service provider and the authentication provider such as a user identity, a user rights level or a street address.

The information retrieved from the credentials database is then built by the authentication server into a SAML assertion, which is then encrypted and transmitted to the service provider. The overall encrypted token can be compatible with the Microsoft Cardspace token format, this would allow RP/SPs to decrypt and respond to tokens using the same mechanism as for Cardspace.

Embodiments of the system described above can provide a number of advantages. First, the system uses normal client-side functionality: the basic features of a typical internet browser are all that is required from the client's user agent. Second, the system is network based, which allows for flexibility and portability; a service provider can readily work with multiple authentication providers and vice versa. Third, the facts that the URLs that are provided to the user are generated dynamically and have only a single-use lifetime help to protect against replay attacks. Fourth, the technique does not rely on HTTP redirects and is thus protected against security exploits that act against HTTP redirects. Fifth, when the user selects one of the URLs to access a service provider, the domain name in that URL will be the service provider's own URL; this can reassure the user that they are being directed to a legitimate site and not a phishing site. Sixth, the system uses independent references for each RP/SP which are unique to each user, this preserves privacy on behalf of the user and protects against attacks that attempt to cross-correlate RP/SPs or users.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method of operating an authentication provisioning unit for authenticating a user to a service provider, the method comprising:

in a first stage of the method:
a) receiving credentials from a user;
b) determining whether the credentials received from the user represent a valid logon; and if that determination is positive, then
c) generating at least one network address comprising a domain address and at least one instance parameter, the instance parameter uniquely identifying the user and the instance of generation of the network address;
d) providing the network address to the user;
e) receiving a parameter from a service provider;
f) determining whether the received parameter indicates a valid attempt to log on to the service provider by checking that the received parameter matches an instance parameter that has previously been provided to a user and that has not previously been received from a service provider; and if that determination is positive, signalling to the service provider over a secure channel a message indicating that the received parameter represents a valid logon attempt, the message including credentials of the user to whom the instance parameter that matches the received parameter had been issued,
wherein a positive determination at step (f) indicates that the parameter received from the service provider is based on the network address provided to the user,
wherein the domain address is a single-use address of the service provider in order that the user is able to access the service provider by the domain address in the absence of redirection and confirm authentication by the instance parameter, and
wherein the network address is provided to the user over a secure channel.

2. A method as claimed in claim, wherein the secure channel over which the network address is provided is an encrypted channel.

3. A method as claimed in claim 1, wherein the secure channel over which the message is signalled to the service provider is an encrypted channel.

4. A method as claimed in claim 1, wherein the network address is provided to the user in the form of a web page having a link to the network address.

5. A method as claimed in claim 4, wherein the instance parameter is an HTTP querystring parameter to the network address.

6. A method as claimed in claim 1, wherein the step of determining whether the received parameter indicates a valid attempt to log on to the service provider comprises checking that user to whom the instance parameter that matches the received parameter had been issued has not logged off from the authentication provision unit since the instance parameter was issued.

7. A method as claimed in claim 1, wherein a plurality of network addresses is generated and provided to the user.

8. A method as claimed in claim 7, wherein the network addresses are provided to the user in the form of iconised links to the network addresses.

9. A method as claimed in claim 1, wherein the instance parameter identifies the time at which it was generated and the step of determining whether the received parameter indicates a valid attempt to log on to the service provider comprises checking that the difference between the time at which the instance parameter that matches the received parameter was generated and the current time is less than a predetermined value.

10. An authentication provision unit for authenticating a user to a service provider, the authentication unit comprising:
a processing system, including a computer processor, the processing system being configured to:
a) receive credentials from a user;
b) determine whether the credentials received from the user represent a valid logon; and if that determination is positive, then
c) generate at least one network address comprising a domain address and at least one instance parameter, the instance parameter uniquely identifying the user and the instance of generation of the network address
d) provide the network address to the user;
e) receive a parameter from a service provider;
determine whether the received parameter indicates a valid attempt to log on to the service provider by checking that the received parameter matches an instance parameter that has previously been provided to a user and that has not previously been received from a service provider; and if that determination is positive, signal to the service provider over a secure channel a message indicating that the received parameter represents a valid logon attempt, the message including credentials of the user to whom the instance parameter that matches the received parameter had been issued,
wherein a positive determination at step (f) indicates that the parameter received from the service provider is based on the network address provided to the user,
wherein the domain address is a single-use address of the service provider in order the user is able to access the service provider by the domain address in the absence of redirection and confirm authentication by the instance parameter, and
wherein the processing system is configured so that the network address is provided to the user over secure channel.

11. The authentication provision unit as claimed in claim 10, wherein the secure channel over which the network address is provided is an encrypted channel.

12. The authentication provision unit as claimed in claim 10, wherein the processing system is configured so that the network address is provided to the user in the form of a web page having a link to the network address.

13. The authentication provision unit as claimed in claim 12, wherein the instance parameter is an HTTP querystring parameter to the network address.

14. The authentication provision unit as claimed in claim 10, wherein the processing system is configured to check that a user to whom the instance parameter that matches the received parameter had been issued has not logged off from the authentication provision unit since the instance parameter was issued.

15. The authentication provision unit as claimed in claim 10, wherein the processing system is configured to generate a plurality of network addresses and provide the plurality of network addresses to the user.

16. The authentication provision unit as claimed in claim 10, wherein the instance parameter identifies the time at which it was generated and the processing system is configured to check that the difference between the time at which the instance parameter that matches the received parameter was generated and the current time is less than a predetermined value.

* * * * *